UNITED STATES PATENT OFFICE.

LORENZ ACH, OF MANNHEIM-WALDHOF, ALBERT ROTHMANN, OF HEIDELBERG, AND HERMANN DIETERICH, OF MANNHEIM, GERMANY, ASSIGNORS TO FARBWERKE VORM. MEISTER LUCIUS & BRUENING, OF HÖCHST-ON-THE-MAIN, GERMANY.

ART OF PREPARING ORGANIC COMPOUNDS CONTAINING ARSENIC.

1,180,627.   Specification of Letters Patent.   Patented Apr. 25, 1916.

No Drawing.   Application filed June 22, 1914.   Serial No. 846,573.

*To all whom it may concern:*

Be it known that we, LORENZ ACH, ALBERT ROTHMANN, and HERMANN DIETERICH, citizens of the German Empire, residing at Mannheim-Waldhof, Heidelberg, and Mannheim, Germany, respectively, have invented certain new and useful Improvements in the Art of Preparing Organic Compounds Containing Arsenic; and we do hereby declare the following to be a full, clear, and exact description of the invention, such as will enable others skilled in the art to which it appertains to make and use the same.

The present invention relates to a process for the manufacture of arseno-benzene derivatives of therapeutical value, and especially to the production of dihalogen-bismethylamino-tetramino-arseno benzenes.

We have found that a bismethylamino-tetramino-arseno benzene, halogenized in the nucleus in ortho position to the arsenic group, and having the following constitution:

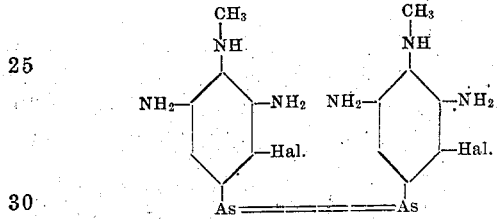

is therapeutically still more efficacious than the non-halogenized bismethylamino-tetramino-arseno benzene: (see U. S. Patent No. 1081079) in so far as the ratio of the curative dose to the tolerated dose is shifted in favor of the halogenized product.

The new derivatives are produced by subjecting organic compounds containing arsenic and having the general formula

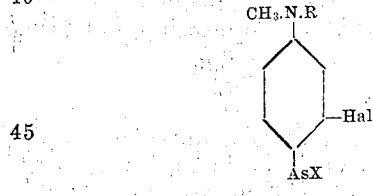

(where R designates a univalent radical such as hydrogen, alkyl or acidyl, Hal. a halogen, and where X indicates that the arsenic is present as arsinic acid or in any form capable of being oxidized to this condition as, for instance, arsenic oxid or arsenious chlorid) to the action of a nitrating reagent and by heating the resulting 2-halogen-4-methylnitramino-3.5-dinitro-benzene-1-arsinic acids with reducing agents such as tin, stannous chlorid, zinc or zinc dust in strong acid solution.

The following examples illustrate the most suitable method of carrying out the process contained in our invention, and are given for the purpose of fully explaining the same.

Example 1: Dissolve 24.5 grams of 2-chloro-4-dimethylamino-benzene-1-arsenic oxid in 245 grams of concentrated sulfuric acid, and cool the solution to a temperature of about —5° C. Add to this solution in small portions at a time 80 grams of nitrating mixture, consisting of equal parts of fuming nitric acid and concentrated sulfuric acid, taking care that the temperature does not rise above 35° C. Allow the mixture to stand for several hours at a temperature of 35° C. and then pour the same upon ice, when the nitro compound separates out in the form of yellow flakes. The compound is filtered off under vacuum and washed with water. To purify the same dissolve the body in sodium acetate solution and, after filtering, precipitate by means of hydrochloric acid. The 2-chloro-3.5-dinitro-4-methylnitramino-benzene-1-arsinic acid obtained in this way forms a slightly yellowish powder which dissolves in sodium hydrate solution with a red color and explodes on heating. It is easily soluble in hot water, methyl and ethyl alcohol, and acetone, insoluble in ether, chloroform and benzene. Add gradually while stirring 15.4 grams of zinc dust to 8 grams of 2-chloro-4-methylnitramino-3.5-dinitro-benzene-1-arsinic acid suspended in 200 cc. of a mixture consisting of equal parts of alcohol and concentrated hydrochloric acid. The nitro compound gradually becomes dissolved. After all the zinc has been added heat the whole over a flame until the solution becomes clear. Add to the filtered liquid another 100 grams of concentrated hydrochloric acid, cool the mixture, and filter off the zinc double salt of the reduction product. Dissolve the product in water and precipitate the dichloro-bismethylamino-tetramino-arseno benzene by the addition of dilute caustic soda lye. The hydrochlorid of the base can be precipitated by adding strongly concentrated hydrochloric acid, filtering, and washing with alcohol and ether. The free base or the dichloro-bismethylamino-tetramino-arseno benzene obtained in this way is insoluble in water. On exposure to the air it quickly turns a dark color. The hydrochlorid is a yellow-green powder easily soluble in water, and in soda and sodium bicarbonate solutions.

Example 2: 8 grams of 2-chloro-4-methylnitramino-3.5-dinitro-benzene-1-arsinic acid obtained in the way described in Example 1 are suspended in 300 grams of concentrated hydrochloric acid, and to this suspension 28 grams of powdered tin are gradually added. The mixture becomes considerably heated thereby so that at the commencement the reaction must be moderated by cooling. The arsinic acid gradually becomes dissolved, and upon cooling thoroughly the stannous bichlorid separates from the mixture. It is drained, dissolved in water, and caustic soda lye added in excess until the tin oxid remains in solution. The base, which separates from the solution, is filtered off, and after washing with water it is dissolved in dilute hydrochloric acid. The hydrochlorid of the base is separated according to the manner described in the preceding example.

Example 3: Dissolve 29 grams of 2-bromo-4-dimethylamino-benzene-1-arsenic oxid in 290 grams of concentrated sulfuric acid and cool to a temperature of −5° C. Add in small portions at a time 80 grams of nitrating acid which have been thoroughly cooled, taking care that the temperature does not rise above 35° C. Keep the mixture for several hours at this temperature, and then pour upon ice when the nitro compound separates out in yellow flakes. Wash the product thoroughly, dissolve in sodium acetate solution, filter, and again precipitate by means of hydrochloric acid. The 2-bromo-4-methylnitramino-3.5-dinitro-benzene-1-arsinic acid obtained in this way is a yellow powder that explodes on heating and decomposes. It dissolves in caustic soda lye with a red color, and is easily soluble in hot water, methyl or ethyl alcohol and acetone. It is insoluble in ether, chloroform, and benzene. Suspend 8.9 grams of 2-bromo-4-methyl-nitramino-3.5-dinitro-benzene-1-arsinic acid obtained in the manner described in 300 grams of concentrated hydrochloric acid. Add gradually to this solution 28 grams of tin dust. A marked rise of temperature is noticeable on the addition of the tin dust. When the reaction is nearly completed heat the mixture on the water bath until the mixture is completely dissolved.

On cooling thoroughly the tin double salt separates out. Filter off the tin double salt, dissolve in water, and treat with an excess of caustic soda lye until the tin oxid remains in solution. Then filter off the precipitated base, wash well with water, and dissolve in dilute hydrochloric acid. The chlorid of the base can be precipitated by adding concentrated hydrochloric acid in excess, filtering off the product obtained, and washing with alcohol and ether. The dibromo-bismethylamino-tetramino-arseno benzene is insoluble in water and quickly changes color on exposing to the air. The yellow-green hydrochlorid is easily soluble in water and in soda and sodium bicarbonate solutions.

It should be noted that in the formula

contained in the following claims the character "R" designates a univalent radical such as hydrogen, alkyl or acidyl.

What we claim, and desire to secure by Letters Patent, is:

1. The process of preparing organic compounds containing arsenic which comprises subjecting an aromatic compound of arsenic containing halogen in the ortho position and the group

where R represents a univalent radical, in the para position to the arsenic group to the action of a nitrating reagent.

2. The process of preparing organic compounds containing arsenic which comprises subjecting a benzene compound of arsenic containing halogen in the ortho position and the group

where R represents a univalent radical, in the para position to the arsenic group to the action of a nitrating reagent.

3. The process of preparing organic compounds containing arsenic which comprises subjecting a benzene arsenic oxid containing halogen in the ortho position and the group

where R represents a univalent radical, in the para position to the arsenic group to the action of a nitrating reagent.

4. The process of preparing organic compounds containing arsenic which comprises subjecting an aromatic compound of arsenic containing chlorin in the ortho position and the group

where R represents a univalent radical, in the para position to the arsenic group to the action of a nitrating reagent.

5. The process of preparing organic compounds containing arsenic which comprises subjecting a benzene arsenic oxid containing chlorin in the ortho position and the group

where R represents a univalent radical, in the para position to the arsenic group to the action of a nitrating reagent.

6. The process of preparing organic compounds containing arsenic which comprises subjecting an aromatic compound of arsenic containing chlorin in the ortho position and the group $N(CH_3)_2$ in the para position to the arsenic group to the action of a nitrating reagent.

7. The process of preparing organic compounds containing arsenic which comprises subjecting a benzene arsenic oxid containing chlorin in the ortho position and the group $N(CH_3)_2$ in the para position to the arsenic group to the action of a nitrating reagent.

8. The process of preparing organic compounds containing arsenic which comprises subjecting an aromatic compound of arsenic containing halogen in the ortho position and the group

where R represents a univalent radical, in the para position to the arsenic group to the action of a mixture of concentrated nitric acid and concentrated sulfuric acid.

9. The process of preparing organic compounds containing arsenic which comprises subjecting an aromatic compound of arsenic containing chlorin in the ortho position and the group $N(CH_3)_2$ in the para position to the arsenic group to the action of a mixture of concentrated nitric acid and concentrated sulfuric acid.

10. The process of preparing organic compounds containing arsenic which comprises subjecting a benzene arsenic oxid containing chlorin in the ortho position and the group $N(CH_3)_2$ in the para position to the arsenic group to the action of a mixture of concentrated nitric acid and concentrated sulfuric acid.

11. The process of preparing organic compounds containing arsenic which comprises subjecting an aromatic compound of arsenic containing halogen in the ortho position and the group

where R represents a univalent radical, in the para position to the arsenic group to the action of a nitrating reagent, and treating the resulting 2-halogen-3.5-dinitro-4-methylnitramino-benzene-1-arsinic acid with reducing agents.

12. The process of preparing organic compounds containing arsenic which comprises subjecting an aromatic compound of arsenic containing halogen in the ortho position and the group

where R represents a univalent radical, in the para position to the arsenic group to the action of a mixture of concentrated nitric acid and concentrated sulfuric acid, and treating the resulting 2-halogen-3.5-dinitro-4-methylnitramino-benzene-1-arsinic acid with reducing agents.

13. The process of preparing organic compounds containing arsenic which comprises subjecting an aromatic compound of arsenic containing chlorin in the ortho position and the group $N(CH_3)_2$ in the para position to the arsenic group to the action of a mixture of concentrated nitric acid and concentrated sulfuric acid, and treating the resulting 2-chloro-3.5-dinitro-4-methylnitramino-benzene-1-arsinic acid with reducing agents.

14. The process of preparing organic compounds containing arsenic which comprises subjecting a benzene arsenic oxid containing chlorin in the ortho position and the group $N(CH_3)_2$ in the para position to the arsenic group to the action of a mixture of concentrated nitric acid and concentrated sulfuric acid, and treating the resulting 2-chloro-3.5-dinitro-4-methylnitramino-benzene-1-arsinic acid with reducing agents.

15. The process of preparing organic compounds containing arsenic which comprises subjecting an aromatic compound of arsenic containing chlorin in the ortho position and the group $N(CH_3)_2$ in the para position to the arsenic group to the action of a mixture of concentrated nitric acid and concentrated sulfuric acid, and treating the resulting 2-chloro-3.5-dinitro-4-methylnitramino-benzene-1-arsinic acid with acid reducing agents.

16. The process of preparing organic compounds containing arsenic which comprises subjecting a benzene arsenic oxid containing chlorin in the ortho position and the group $N(CH_3)_2$ in the para position to the arsenic group to the action of a mixture of concentrated nitric acid and concentrated sulfuric acid, and treating the resulting 2-chloro-3.5-dinitro-4-methylnitramino-benzene-1-arsinic acid with acid reducing agents.

17. The process of preparing organic compounds containing arsenic which comprises subjecting an aromatic compound of arsenic containing chlorin in the ortho position and the group $N(CH_3)_2$ in the para position to the arsenic group to the action of a mixture of concentrated nitric acid and concentrated sulfuric acid, and treating the resulting 2-chloro-3.5-dinitro-4-methylnitramino-benzene-1-arsinic acid with a metal and an acid.

18. The process of preparing organic compounds containing arsenic which comprises subjecting a benzene arsenic oxid containing chlorin in the ortho position and the group $N(CH_3)_2$ in the para position to the arsenic group to the action of a mixture of concentrated nitric acid and concentrated sulfuric acid, and treating the resulting 2-chloro-3.5-dinitro-4-methylnitramino-benzene-1-arsinic acid with a metal and an acid.

19. The process of preparing organic compounds containing arsenic which comprises subjecting an aromatic compound of arsenic containing chlorin in the ortho position and the group $N(CH_3)_2$ in the para position to the arsenic group to the action of a mixture of concentrated nitric acid and concentrated sulfuric acid, and treating the resulting 2-chloro-3.5-dinitro-4-methylnitramino-benzene-1-arsinic acid with tin and an acid.

20. The process of preparing organic compounds containing arsenic which comprises subjecting a benzene arsenic oxid containing chlorin in the ortho position and the group $N(CH_3)_2$ in the para position to the arsenic group to the action of a mixture of concentrated nitric acid and concentrated sulfuric acid, and treating the resulting 2-chloro-3.5-dinitro-4-methylnitramino-benzene-1-arsinic acid with tin and an acid.

21. The process of preparing organic compounds containing arsenic which comprises subjecting an aromatic compound of arsenic containing chlorin in the ortho position and the group $N(CH_3)_2$ in the para position to the arsenic group to the action of a mixture of concentrated nitric acid and concentrated sulfuric acid, and treating the resulting 2-chloro-3.5-dinitro-4-methylnitramino-benzene-1-arsinic acid with tin and hydrochloric acid.

22. The process of preparing organic compounds containing arsenic which comprises subjecting a benzene arsenic oxid containing chlorin in the ortho position and the group $N(CH_3)_2$ in the para position to the arsenic group to the action of a mixture of concentrated nitric acid and concentrated sulfuric acid, and treating the resulting 2-chloro-3.5-dinitro-4-methylnitramino-benzene-1-arsinic acid with tin and hydrochloric acid.

23. The process of preparing organic compounds containing arsenic which comprises subjecting an aromatic compound of arsenic containing chlorin in the ortho position and the group $N(CH_3)_2$ in the para position to the arsenic group to the action of a mixture of concentrated nitric acid and concentrated sulfuric acid, and treating the resulting 2-chloro-3.5-dinitro-4-methylnitramino-benzene-1-arsinic acid with finely powdered tin and hydrochloric acid.

24. The process of preparing organic compounds containing arsenic which comprises subjecting a benzene arsenic oxid containing chlorin in the ortho position and the group $N(CH_3)_2$ in the para position to the arsenic group to the action of a mixture of concentrated nitric acid and concentrated sulfuric acid, and treating the resulting 2-chloro-3.5-dinitro-4-methylnitramino-benzene-1-arsinic acid with finely powdered tin and hydrochloric acid.

25. The process of preparing organic compounds containing arsenic which consists in subjecting an aromatic compound of arsenic containing halogen in the ortho position and the group

where R represents a univalent radical, in the para position to the arsenic group to the action of a mixture of concentrated nitric acid and concentrated sulfuric acid, treating the resulting 2-halogen-3.5-dinitro-4-methylnitramino-benzene-1-arsinic acid with finely powdered tin and hydrochloric acid, cooling and separating the resulting tin salt of the 2,2'-dihalogen-3,5,3',5'-tetramino-4,4-bismethylamino-1,1'-arseno-benzene, dissolving the same in water and adding sodium hydrate solution in excess.

26. The process of preparing organic compounds containing arsenic which consists in subjecting 2-chloro-4-dimethylamino-benzene-1-arsenic oxid to the action of a mixture of concentrated nitric acid and concentrated sulfuric acid, treating the resulting 2-chloro-3.5-dinitro-4-methylnitramino-benzene-1-arsinic acid with finely powdered tin and hydrochloric acid, cooling and separating the resulting tin salt of the 2,2'-dichloro-3,5,3'5'-tetramino-4,4'-bismethylamino-1,1'-arseno-benzene, dissolving the same in water and adding sodium hydrate solution in excess.

27. As a new class of chemical compounds the 2,2'-dihalogen-3,5,3'5'-tetramino-4,4'-bismethylamino-1,1'-arseno benzenes of the general formula.

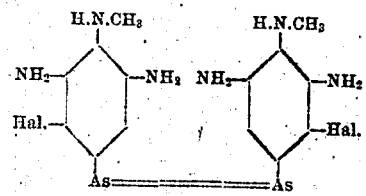

these bases having a great bactericidal action and being solid and yellow colored, insoluble in water and darkening on exposure to the air, the hydrochlorids of the bases being easily soluble in water and in soda and sodium bicarbonate solutions.

28. As a new composition of matter the 2,2'-dichloro-3,5,3',5'-tetramino-4,4'-bis-methylamino-1',1'-arseno-benzene, a solid and yellow colored base with great bactericidal action which is insoluble in water and darkening on exposure to the air; the hydrochlorid of the base being easily soluble in water and in soda and sodium bicarbonate solutions.

In testimony whereof we hereunto affix our signatures in the presence of two witnesses.

LORENZ ACH.
ALBERT ROTHMANN.
HERMANN DIETERICH.

Witnesses as to Albert Rothmann and Hermann Dieterich:
FRITZ MOELLER,
H. MERLE COCHRAN.

Witnesses as to Lorenz Ach:
JEAN GRUND.
CARL GRUND.